United States Patent
Crary et al.

(10) Patent No.: US 9,435,302 B2
(45) Date of Patent: Sep. 6, 2016

(54) THRESHOLD CONDITION INDICATION IN VEHICLE FUEL SYSTEM

(75) Inventors: Lynwood F. Crary, Preston, CT (US); Alastair R. Deane, Rochester Hills, MI (US); John R. Forgue, Cheshire, CT (US)

(73) Assignee: TI GROUP AUTOMOTIVE SYSTEMS, L.L.C., Auburn Hills, MI (US)

( * ) Notice: Subject to any disclaimer, the term of this patent is extended or adjusted under 35 U.S.C. 154(b) by 735 days.

(21) Appl. No.: 13/433,882

(22) Filed: Mar. 29, 2012

(65) Prior Publication Data

US 2013/0256161 A1    Oct. 3, 2013

(51) Int. Cl.
| F02M 37/00 | (2006.01) |
| F02B 77/08 | (2006.01) |
| F02D 41/22 | (2006.01) |
| B60K 15/03 | (2006.01) |

(52) U.S. Cl.
CPC .... *F02M 37/0082* (2013.01); *B60K 15/03006* (2013.01); *F02B 77/08* (2013.01); *F02D 41/22* (2013.01)

(58) Field of Classification Search
CPC .. F02B 77/08; F02M 37/00; F02M 37/0082; F02M 37/10; G01D 21/00; G01F 23/00; G01K 1/02; G01L 7/08; G01R 19/00; G08B 19/00
USPC .......... 116/2, 206, 207, 216, 227, 266, 267, 116/268, 270, 272; 73/715
See application file for complete search history.

(56) References Cited

U.S. PATENT DOCUMENTS

| 3,736,899 A | * | 6/1973 | Manske | 116/270 |
| 3,949,610 A | * | 4/1976 | Pietsch | 73/715 |
| 4,019,120 A | * | 4/1977 | Fattic | 322/28 |
| 4,029,042 A | * | 6/1977 | Juhasz | 116/267 |
| 4,121,457 A | * | 10/1978 | Yoshida et al. | 73/291 |
| 4,352,437 A | * | 10/1982 | Bernatt | 220/89.3 |
| 4,370,211 A | * | 1/1983 | Hybler | 205/730 |
| 4,745,797 A | * | 5/1988 | Wegrzyn | 73/40.7 |
| 4,764,727 A | * | 8/1988 | McConchie, Sr. | G01R 31/026 324/384 |
| 4,884,033 A | * | 11/1989 | McConchie, Sr. | 324/503 |
| 5,237,957 A | * | 8/1993 | Liucci | 116/267 |
| 5,253,674 A | * | 10/1993 | Argyle et al. | 137/559 |
| 5,592,962 A | * | 1/1997 | Hooberman | 137/68.22 |

(Continued)

FOREIGN PATENT DOCUMENTS

| GB | 2458141 A | * | 9/2009 | C23F 13/22 |
| JP | 11264753 A | * | 9/1999 | G01F 23/22 |

(Continued)

OTHER PUBLICATIONS

EP Search Report of Jul. 25, 2013 in EP 13159181.0, 5 pages.

*Primary Examiner* — R. A. Smith
(74) *Attorney, Agent, or Firm* — Brinks Gilson & Lione

(57) ABSTRACT

A fuel system component may include a body arranged for use in storing or moving fuel within the fuel system, and an indicator associated with the body to provide an indication when the body is subjected to a condition outside of a threshold. The indicator may be responsive to one or more environmental or system conditions outside of a threshold. For example without limitation, the indicator may be responsive to one or more of temperature, pressure, corrosion and electrical conditions to provide an indication when at least one condition exceeds a threshold for that condition.

13 Claims, 3 Drawing Sheets

(56) References Cited

U.S. PATENT DOCUMENTS

| | | | | |
|---|---|---|---|---|
| 5,623,891 | A * | 4/1997 | Miller | 116/271 |
| 5,739,755 | A * | 4/1998 | Goldenberg | 340/627 |
| 5,750,888 | A * | 5/1998 | Matsumoto | F02M 25/0809 73/114.39 |
| 5,780,721 | A * | 7/1998 | Levens | 73/40 |
| 6,131,443 | A * | 10/2000 | Duncan | 73/86 |
| 6,252,371 | B1 * | 6/2001 | Kubozuka et al. | 318/696 |
| 6,260,540 | B1 * | 7/2001 | Hiraiwa et al. | 123/497 |
| 6,302,144 | B1 * | 10/2001 | Graham et al. | 137/565.17 |
| 6,323,656 | B2 * | 11/2001 | Shoemaker | 324/537 |
| 6,536,264 | B1 * | 3/2003 | Flammersfeld et al. | 73/86 |
| 6,817,311 | B1 * | 11/2004 | Treen et al. | 116/270 |
| 6,875,258 | B2 | 4/2005 | Kuperus | |
| 6,932,891 | B2 * | 8/2005 | Wigg et al. | 204/196.06 |
| 7,091,819 | B1 | 8/2006 | Forgue | |
| 7,296,600 | B2 | 11/2007 | Ferreria et al. | |
| 7,565,837 | B2 | 7/2009 | Crary et al. | |
| 7,780,913 | B2 * | 8/2010 | Farmer | 422/50 |
| 7,943,091 | B2 * | 5/2011 | Beck et al. | 422/82.05 |
| 7,990,275 | B1 * | 8/2011 | Milanovich | F02M 37/0082 210/741 |
| 8,602,065 | B2 * | 12/2013 | Aulanko et al. | 138/104 |
| 2003/0051540 | A1 * | 3/2003 | Morinaga et al. | 73/118.1 |
| 2003/0056587 | A1 * | 3/2003 | Carpenter et al. | 73/290 R |
| 2005/0279406 | A1 * | 12/2005 | Atwood et al. | 137/39 |
| 2006/0039112 | A1 * | 2/2006 | Minamitani | C09K 5/10 361/699 |
| 2008/0098993 | A1 * | 5/2008 | Hoffman | F02M 37/08 123/513 |
| 2008/0295809 | A1 | 12/2008 | Hochstein et al. | |
| 2009/0095061 | A1 * | 4/2009 | Fujino et al. | 73/114.41 |
| 2012/0027045 | A1 * | 2/2012 | McLellan et al. | 374/160 |
| 2012/0053754 | A1 * | 3/2012 | Pease et al. | 701/1 |
| 2012/0060935 | A1 * | 3/2012 | Carter et al. | 137/14 |
| 2012/0204980 | A1 | 8/2012 | Nishizawa et al. | |
| 2012/0279581 | A1 | 11/2012 | Wada | |

FOREIGN PATENT DOCUMENTS

| | | | | |
|---|---|---|---|---|
| JP | 2008091244 A * | 4/2008 | | H01M 8/04 |
| WO | WO 2011064903 A1 * | 6/2011 | | F02M 37/00 |
| WO | WO 2011078247 A1 * | 6/2011 | | F02M 37/00 |

* cited by examiner

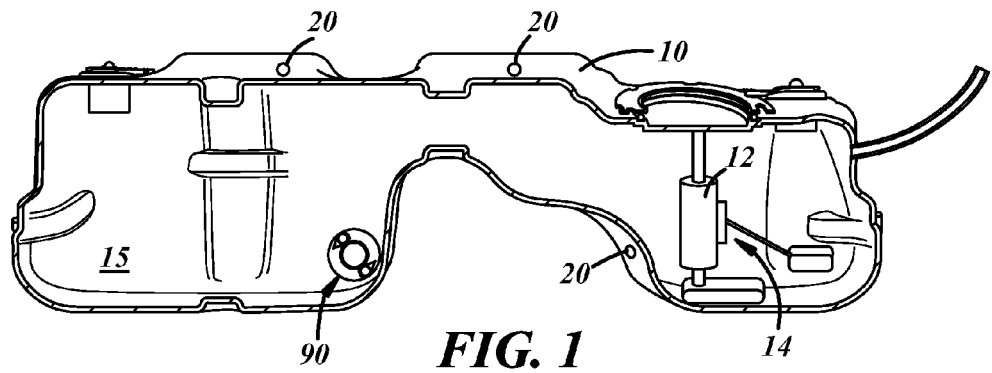
FIG. 1
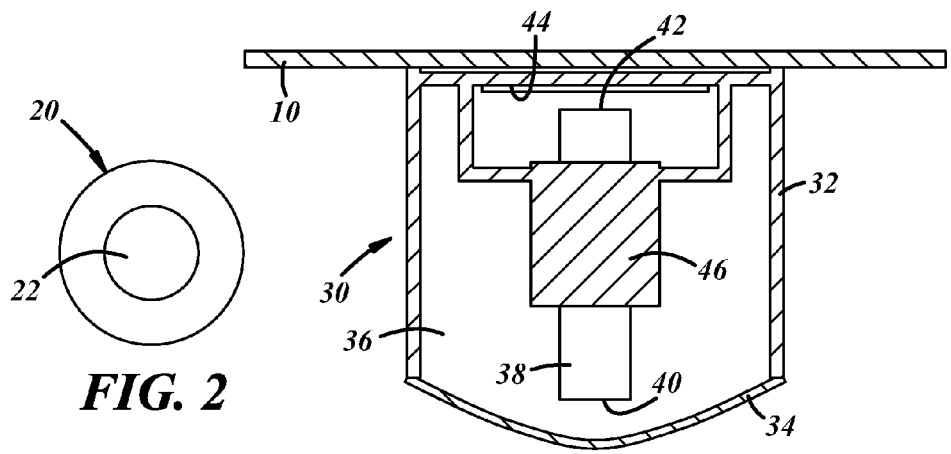
FIG. 2
FIG. 3
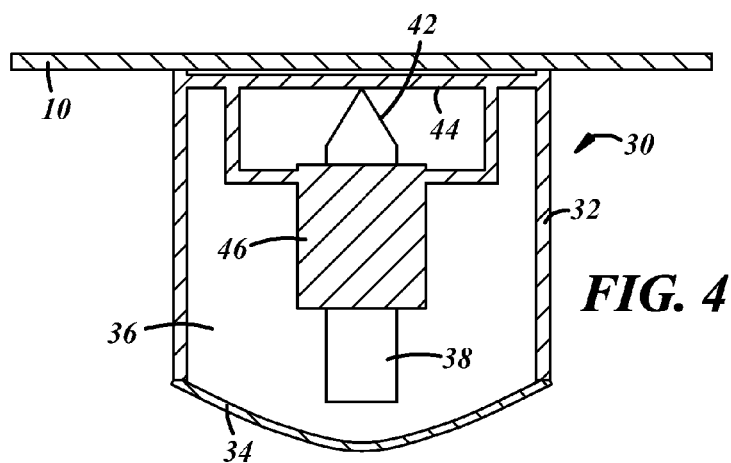
FIG. 4

THRESHOLD CONDITION INDICATION IN VEHICLE FUEL SYSTEM

TECHNICAL FIELD

The present disclosure relates generally to a vehicle fuel system and more particularly to indicating presence of one or more threshold conditions in vehicle fuel system components.

BACKGROUND

Vehicle fuel systems include many components that are exposed to a variety of environmental and operating conditions. In use, some fuel system components may fail or not operate as intended. It can sometimes be difficult to determine the cause of the failure or worse than intended operation. So it can be difficult to determine if the cause is within the component itself, an associated component or due to a condition beyond that for which the component was designed. For example, if a component is subjected to a higher than intended temperature, pressure, electrical supply or the like, failure or decreased performance of the component may not be indicative of any problem with the component itself.

SUMMARY

A fuel system component may include a body arranged for use in storing or moving fuel within the fuel system, and an indicator associated with the body to provide an indication when the body is subjected to a condition outside of a threshold. The indicator may be responsive to one or more environmental or system conditions outside of a threshold. For example without limitation, the indicator may be responsive to one or more of temperature, pressure, corrosion and electrical conditions to provide an indication when at least one condition exceeds a threshold for that condition.

At least one implementation of a fuel tank includes a wall defining an interior in which a supply of fuel is maintained, and an indicator carried by the fuel tank to provide an indication when the fuel tank is exposed to a condition beyond a threshold. The indicator has a first state when the fuel tank has not been exposed to a condition beyond the threshold and a second state after the fuel tank is exposed to a condition beyond the threshold. For example without limitation, the indicator may be responsive to one or more of temperature, pressure, and corrosion conditions to provide an indication when at least one condition exceeds a threshold for that condition.

At least one implementation of a fuel system component to which electricity is applied in use includes positive and negative power terminals to which power is supplied to the component, and an electric threshold indicator communicated with the power terminals and operative to change from a first state to a second state when the voltage applied to the power terminals is beyond a threshold. In at least one form, the electric threshold indicator is responsive to a voltage beyond a threshold voltage to change to the second state of the indicator.

BRIEF DESCRIPTION OF THE DRAWINGS

The following detailed description of exemplary embodiments and best mode will be set forth with reference to the accompanying drawings, in which:

FIG. 1 is a cross sectional view of a vehicle fuel tank showing an interior of the fuel tank, a fuel pump and a fuel level sensor;

FIG. 2 is a plan view of a threshold temperature indicator;

FIG. 3 is a cross sectional view of a threshold pressure indicator;

FIG. 4 is a cross sectional view of an indicator illustrating a pin engaged with an indicating surface;

DETAILED DESCRIPTION OF PRESENTLY PREFERRED EMBODIMENTS

Figure 6:
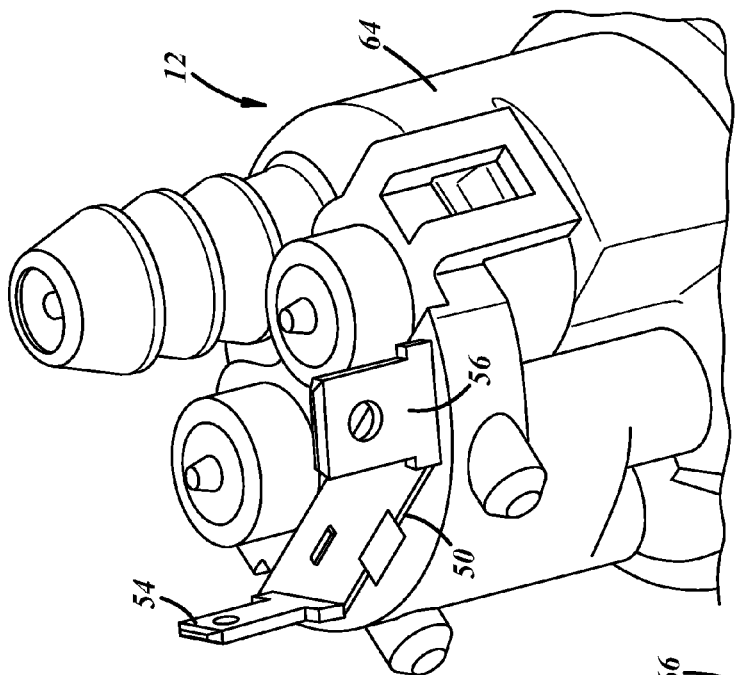
FIG. 6 is a perspective view of a portion of a fuel pump including a threshold electrical indicator.

Referring in more details to the drawings, FIGS. 1 and 5-7 illustrate components of a vehicle fuel system including, for example, a fuel tank 10, a fuel pump 12 and a fuel level sensor 14. The fuel tank 10 includes an internal volume 15 in which liquid fuel may be stored. The fuel pump 12 may be an electric motor driven pump that takes in fuel from the fuel tank 10, pressurizes the fuel and delivers the fuel under pressure to an engine. The fuel level sensor 14 may include a variable resistor circuit 16 (FIG. 7) that provides an indication of the level of fuel in the fuel tank 10.

In use on a vehicle, these and other fuel system components may be subjected to varying environmental and/or operating conditions that may affect their performance, durability and reliability. For example, the components may be subjected to different temperatures, pressures, power supplies, and types of fuel, among other conditions and things that may vary. At times, the components may be subjected one or more conditions beyond which they were designed for. Damage to or failure of the components when subjected to these extreme conditions might not be indicative of a fault or problem with the fuel system component and might instead indicate a fault or problem with a different vehicle component or system. When reviewing a fuel system component 10, 12, 14 that may be damaged or have failed, it can be difficult to determine, after the fact, whether the component was built to specifications or not. Accordingly, it can be difficult to determine if there was a design or manufacturing issue with any particular component or if the component was subjected to a condition beyond a specified range or threshold.

As shown in FIGS. 1-8 one or more fuel system components may be provided with a threshold sensor or indicator to determine if the components have been subjected to an operating condition that is beyond a threshold. The threshold indicators may change state from a first state to a second state when a threshold condition has been exceeded. In at least some forms, the change from the first state to the second state is permanent and may be visually apparent upon inspection of the indicator. In this way, the fact that the fuel system component has been exposed to a condition beyond a given threshold can be readily determined.

In one implementation, as shown in FIGS. 1 and 2, the fuel tank 10 may include a temperature responsive threshold indicator 20 to provide an indication when the fuel tank 10 has been subjected to a temperature beyond a threshold. For example, in some passenger vehicles an exhaust pipe may be routed in close proximity to part of the fuel tank 10. The exhaust pipe can become very hot in operation of the vehicle and heat radiating from the exhaust pipe is absorbed by adjacent components of the vehicle. To reduce or inhibit this heat transfer to adjacent components, heat shields can be installed between the exhaust pipe and, for example, the fuel tank. The head shields might not be designed properly to sufficient protect the fuel tank 10, can become damaged from road debris or corrosion, and in some instances, they might not be installed correctly. Even if the heat shields are properly designed, installed correctly and undamaged, incorrect engine operation can result in higher than normal operating temperatures and higher than desired exhaust gas temperature such that the fuel tank 10 is subjected to higher than desired temperatures. In instances where the fuel tank 10 is subjected to heat beyond what the fuel tank 10 was designed for, damage to or failure of the fuel tank 10 when subjected to such heat is not an indication that the fuel tank 10 was incorrectly designed or manufactured.

To provide an indication that the fuel tank 10 has been subjected to heat beyond a threshold, the temperature threshold indicator 20 may change state when subjected to heat beyond the threshold. In one form, the temperature threshold indicator 20 may have an indicator portion 22 that changes color when heated to a temperature beyond a threshold. The indicator portion 22 may include an ink or temperature sensitive material or film that changes color when heated beyond the threshold, or a wax or other material that melts or otherwise changes shape or form when heated beyond a threshold.

The temperature threshold indicator 20 may be located on an area of the tank 10 most likely to experience a temperature beyond a threshold, such as (but not limited to), in the area of the exhaust pipe or heat shields. The temperature threshold indicator 20 may be adhered to the tank, such as by glue, and could be a sticker applied to the exterior of the tank in one or several locations. The indicator 20 could be molded into the fuel tank 10 during manufacture of the tank, or the indicator 20 could be coupled to the tank 10 in any other desired manner such as a weld, heat stake, clamp, fastener, etc. The indicator 20 could be located on one or more discrete portions of the fuel tank 10, or it could cover all of the fuel tank, if desired. Further, the indicator 20 could be responsive to multiple thresholds, or multiple indicators could be provided each having a different threshold. This may facilitate determination of a range of temperature that the fuel tank 10 was exposed to where the maximum temperature the fuel tank 10 was exposed to might be above one threshold, but below another threshold. This could be accomplished, for example, with one indicator that has multiple states, where different thresholds are represented by each of the multiple states, or with multiple different indicators as noted above.

While discussed above with regard to a fuel tank 10, the temperature threshold indicator 20 may be used with other components. For example, the fuel pump 12, fuel conduits, fuel rail, connectors and the like may also include one or more temperature threshold indicators to provide an indication if these components have been subjected to higher than desired temperatures. Further, while discussed above with regard to a higher than desired temperature, the temperature threshold indicator 20 may also be designed to indicate a lower than desired temperature. Still further, the temperature threshold indicator 20 may also provide an indication of the amount of time a component is exposed to or at an elevated temperature. Any suitable way to indicate time may be used, including an indicator having a thickness or other dimension that is reduced (for example, by melting) as a function of the time at an elevated temperature.

Conditions other than temperature may be relevant to the proper operation of fuel system components, like the fuel tank 10. For example, excess pressure within the fuel tank 10 may affect the fuel tank. A pressure responsive threshold indicator 30 (FIG. 3) may be provided to provide an indication when a threshold pressure has been exceeded. The pressure threshold indicator 30 may be activated once the pressure exceeds a single threshold, or it may indicate several threshold pressure conditions. To do this, the pressure threshold indicator may have multiple indicators, or multiple indicators may be used with each having a different pressure at which it is activated.

As shown in FIG. 3, one implementation of a pressure threshold indicator 30 includes a housing 32, and a membrane or diaphragm 34 carried by the housing 32 to define a reference chamber 36 on one side. The diaphragm 34 is acted upon by the pressure within the fuel tank 10 on its side opposite the reference chamber 36. Hence, a higher pressure within the tank 10 tends to displace the diaphragm 34 in a direction reducing the volume of the reference chamber 36. The indicator 30 is actuated by movement of the diaphragm 34 in response to a pressure within the fuel tank 10 that is greater than a threshold. The indicator 30, in the example shown, may include a shank or pin 38 with a first end 40 responsive to movement of the diaphragm 34 to cause the opposite second end 42 of the pin 38 to engage a indicating surface 44. In the example shown, the first end 40 of the pin 38 may be directly engaged or actuated by the diaphragm 34 to cause the second end 42 to engage the indicating surface 44 upon sufficient movement of the diaphragm 34 which occurs when the pressure within the fuel tank 10 is above a threshold pressure. The indicating surface 44 may be part of the fuel tank 10, or part of the indicator 30. The pin 38 may be held in place by a carrier 46 which may be formed in one piece with the housing 32 or it may be a separate component. The carrier 46 may permit slidable movement of the pin 38 relative to the carrier 46 and housing 32, or the carrier 46 may be flexible to permit movement of the pin 38 toward the indicating surface 44 without relative slidable movement between the pin 38 and carrier 46. As shown in FIG. 4, the second end 42 of the pin 38 may have a reduced surface area (for example, it may be pointed or sharp) to facilitate providing a mark or indentation in the indicating surface 44. The depth of any mark or indentation may correspond to the pressure condition that caused the mark to be made. In this way, the maximum pressure realized in the fuel tank 10 may be determined by correlation to the depth of a mark formed in the indicating surface 44. Of course, the indicating surface 44 could be arranged differently, for example with a pressure sensitive film that changes color according to the magnitude of pressure applied to the film. In this case, the pin may still be used to amplify the pressure force applied to the film. And/or a film or membrane 44 that may rupture or be ruptured or pierced (such as by the pin 38) when the pressure in the fuel tank 10 is beyond a threshold may be used as part or all of the pressure indicator. The pressure threshold indicator 30 may also include a compressible or otherwise deformable surface that compresses or deforms when exposed to a pressure beyond a threshold to provide an indication that the pressure within the fuel tank 10 exceeded the threshold pressure.

Figure 5:
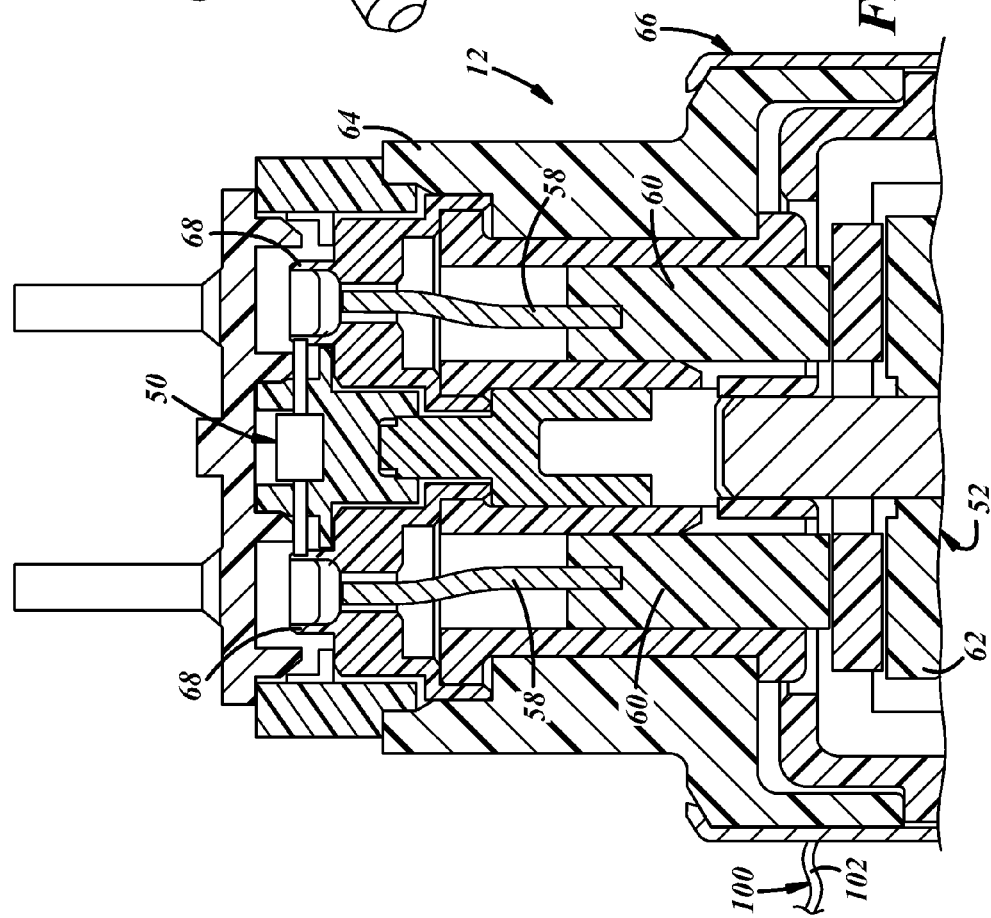
FIG. 5 is a cross sectional view of a portion of a fuel pump including a threshold electrical indicator.
Figure 7:
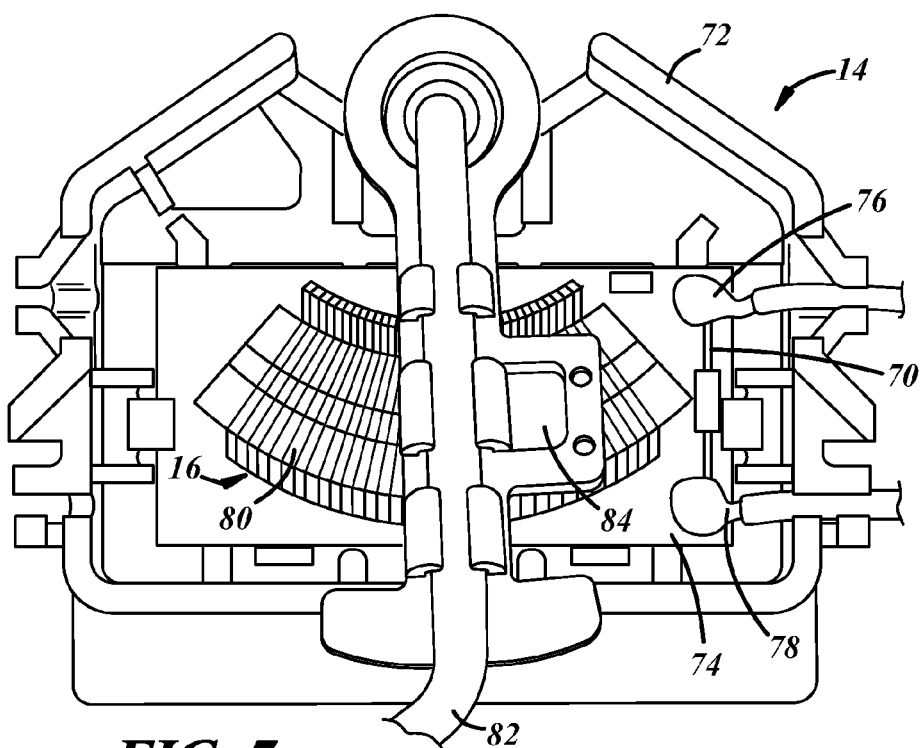
FIG. 7 is a perspective view of a portion of a fluid level sensor including a threshold electrical indicator.

Exceeding an electrical threshold condition can also be determined by a sensor or indicator. FIGS. 5-7 illustrate a few examples of components with an electrically responsive threshold indicator 50 to enable determination whether a threshold voltage has been exceeded in use of the components.

FIG. 5 illustrates a portion of a fuel pump 12 that includes an electrically driven motor 52. The motor 52 (only a portion of which is shown) may include positive and negative terminals 54, 56 through which power is supplied to shunt wires 58 that are coupled to brushes 60 of the motor 52. The brushes 60 engage a commutator 62 to transmit power to a rotor (not shown) in known manner. The terminals 54, 56 may extend outside of an end cap 64 of the pump housing 66 to facilitate connecting power transmission wires to the terminals. The brushes 60, shunt wires 58 and other components may be contained within the end cap 64 and/or pump housing 66.

To determine if a threshold voltage has been exceeded, an electrical threshold indicator 50 may be connected across the shunt wires 58, or across conductive caps 68 coupled to the shunt wires 58, or in a Radio Frequency Interference (RFI) circuit of the fuel pump, by way of a few non-limiting examples. In this example, the threshold indicator is a zener diode 50 and the trip or knee voltage of the zener diode may define the threshold voltage. If the knee voltage were exceeded in use of the fuel pump 12, the zener diode 50 would conduct enough current across the leads to become damaged. Hence, if after use of the fuel pump 12 the zener diode 50 is damaged, it could be determined that the maximum or threshold voltage was exceeded. This information may be useful, for example, if the fuel pump 12 experiences problems in operation and/or in determining the source of operational issues with a plurality of fuel pumps. As shown in FIG. 6, the threshold electrical indicator 50 may also be connected across the power terminals 54, 56 of the pump 12. In this example, a zener diode 50 is also used as the threshold electrical indicator.

A similar concept can be used in other electrical components. For example, as shown in FIG. 7, a fuel level sensor 14 may include a threshold electrical indicator 70 to determine if a threshold power supplied to the level sensor 14 is exceeded. The level sensor 14 shown includes a housing 72, a circuit board 74, positive and negative terminals 76, 78 through which power is supplied to the circuit board 74, conductive traces 80 on the circuit board 74, an arm 82 that moves as a function of the fuel level being sensed, and a follower 84 on the arm that engages the conductive traces 80. The position of the follower 84 along the conductive traces 80 varies corresponding to the level of fuel being sensed. As the follower 84 is moved along the conductive trace 80, the resistance in the circuit changes and the resistance in the circuit is sensed to provide an indication of the level of fuel.

In this example, the threshold electrical indicator is a zener diode 70 that is connected across the positive and negative terminals 76, 78 of the level sensor 14. In more detail, as shown, the zener diode 70 may be connected to solder pads by which the positive and negative wires or terminals are connected to a circuit board 74 of the level sensor 14. If the knee voltage of the zener diode 70 is exceeded, the zener diode 70 will be damaged, as previously described. Instead of, or in addition to, the zener diode, a sacrificial trace can be provided on the level sensor to provide evidence of an over-voltage condition. Also, if polarity is an issue, a bi-directional zener diode or voltage variable resistor may be used, having a knee voltage in two directions. This would eliminate any issue caused by reverse connection of the diode/resistor.

A threshold indicator may also be provided to enable determination of whether a threshold corrosivity of the fuel in the fuel system has been exceeded. Different fuels have different chemical compositions, and some fuel include more corrosive components than other fuels. For example, sulfur, ethanol and water content in fuels can corrode or otherwise react with certain materials and components. Accordingly, fuel system components designed for a given type or range of fuels may be damaged or affected if used with more corrosive fuels, or fuels containing more of a particular substance or substances. Should a component not perform as expected, it may be helpful to know if that component was subjected to fuel that was more corrosive than intended for use with the component.

Figure 8:
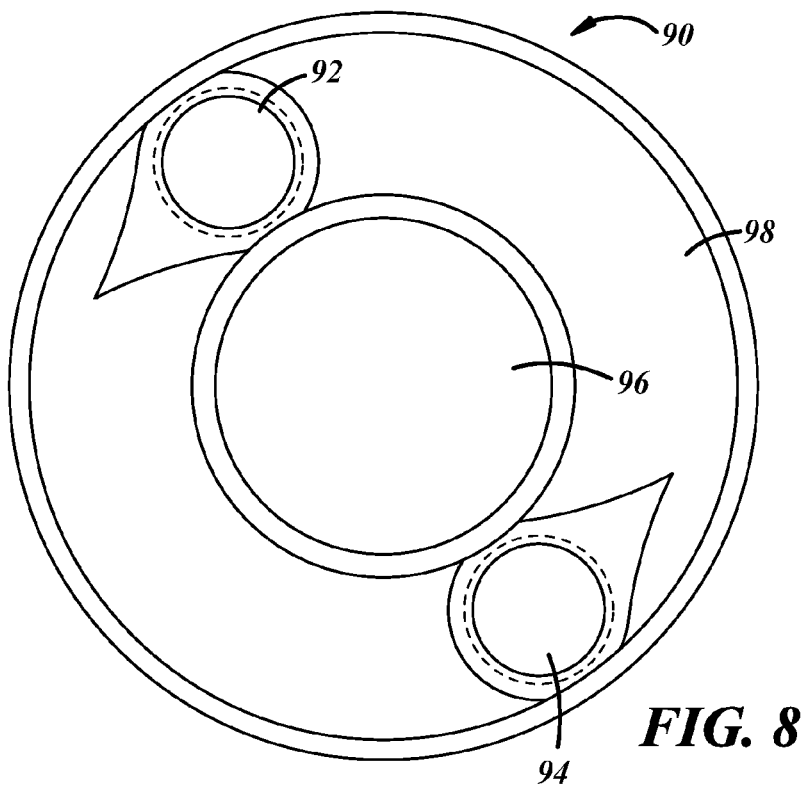
FIG. 8 is a plan view of a threshold condition indicator that may indicate whether any of multiple conditions exceeded thresholds for such conditions.

As shown in FIGS. 1 and 8, a condition indicator 90 may be provided. The indicator 90 may be responsive to one or more conditions with the fuel system, such as temperature, pressure, corrosion and electrical. As shown, the condition indicator 90 may include a temperature threshold indicator 92, a pressure threshold indicator 94 and a corrosion threshold indicator 96. The condition indicator 90 may include a main body 98 that carries the indicators 92, 94 and 96 as one multi-purpose unit. The body 98 may be located in or on the fuel tank or any of the components within the fuel tank, such as the fuel pump or on a module including the fuel pump. To facilitate assembly, the body 98 may include an adhesive so the body sticks to the fuel tank or other component. Of course, the body could be welded, bonded or otherwise coupled to the fuel tank or other component either while the tank or other component is being formed or after it has been formed. The corrosion indicator 96 may include a material that reacts with a given corrosive element to be sensed. For example, sulfur will react with silver. So, to sense the presence of sulfur in a fuel, an indicator could be located in an area where it will be contacted by fuel and the indicator 96 could include silver plating. Exposure of the silver plating to sulfur would leave oxides on the surface of the silver plating to provide an indication that the fuel used contained sulfur. The indicator 96 could be designed so that only a threshold concentration of sulfur (or other fuel component) causes an indication of corrosion on the indicator 96, when some sulfur is acceptable but beyond a threshold amount or concentration is not. A similar approach could be used for other corrosive fuel components. In this way, the corrosion indicator 96 changes from a first state to a second state when exposed to something that is more corrosive than the threshold. The corrosion indicator 96 could also be a sacrificial material. And the temperature and pressure threshold indicators 92, 94 could be of any suitable type, including at least any of the types already mentioned.

FIG. 5 illustrates another threshold corrosion indicator 100. In this example, the indicator includes or is comprised of a sacrificial member 102 that may be connected to a metallic component of the system. For example, the sacrificial member 102 could be connected to an outer shell 104 of the fuel pump housing 66 so that the sacrificial member 102 will corrode before the shell 104 corrodes. Accordingly, inspection of the sacrificial member 102 can determine if the environment in which the fuel pump was used was corrosive beyond a designed or intended amount. The sacrificial member 102 can be made of any suitable material to detect a desired corrosive element or elements, and the member 102 may be connected to components other than the fuel pump, as desired. Further, the member 102 is diagrammatically shown in FIG. 5, as its connection to the fuel pump shell 104. The member may be of any shape and size desired, and may be connected in any suitable manner and at any suitable location on the component with which it is used.

Accordingly, various threshold indicators may be used to provide an indication that fuel system components were exposed to conditions beyond predetermined thresholds. These thresholds may relate to temperature, pressure, corrosion, or electrical signal (for example, over voltage). The knowledge that the components were subjected to a condition outside of a threshold may be useful in determining if an operational problem experienced with the component is an indication of a design flaw (and a possible warranty issue) or is likely to be a more isolated occurrence in view of the conditions in which the component was used. The threshold indicators may be readily incorporated on or as part of existing fuel system components. The threshold indicators may also be carried by or near to the fuel system components so that the threshold indicators are directly affected by the conditions acting on the fuel system components and not outside factors. For example, while the vehicle electrical system may include one or more fuses, a blown fuse in the fuel pump circuit does not necessarily mean that the fuel pump itself caused an elevated current draw as the problem may be in a wire, wiring harness, controller, or other component. However, an electrical threshold indicator directly associated with the power supply at the fuel pump (i.e. the power leads or terminals) can provide an indication that relates directly to the fuel pump.

While the forms of the invention herein disclosed constitute presently preferred embodiments, many others are possible. It is not intended herein to mention all the possible equivalent forms or ramifications of the invention. It is understood that the terms used herein are merely descriptive, rather than limiting, and that various changes may be made without departing from the spirit or scope of the invention.

The invention claimed is:

1. A fuel system component, comprising:
a body arranged for use in storing or moving fuel within the fuel system;
an indicator associated with the body to provide an indication when the body is subjected to a condition outside of a threshold and the condition relates to at least one of a pressure greater than a threshold pressure or a voltage provided to a component to enable operation of the component that is greater than a threshold voltage, wherein the indicator is a single use indicator that indicates that the condition outside of the threshold has been reached;
wherein the indicator is carried by the body and responsive to conditions directly experienced by the body; and
wherein the indicator is an electrical threshold indicator and is directly carried by a fuel pump or a fuel level sensor of the fuel system.

2. The component of claim 1 wherein a pressure threshold indicator is carried by a fuel tank of the fuel system, within an interior of the fuel tank.

3. A fuel system component, comprising:
a body arranged for use in storing or moving fuel within the fuel system;
an indicator associated with the body to provide an indication when the body is subjected to a condition outside of a threshold, wherein the indicator is responsive to a voltage applied to the component that is greater than a threshold voltage;
wherein the indicator includes a diode;
wherein the diode is a zener diode with a knee voltage at the threshold voltage.

4. The component of claim 3 wherein the body is one of a portion of an electric motor fuel pump or a portion of a fluid level sensor, and the zener diode is connected across the power leads of said fuel pump or fluid level sensor and wherein the zener diode is damaged when the knee voltage is exceeded.

5. A fuel system component, comprising:
a body arranged for use in storing or moving fuel within the fuel system;
an indicator associated with the body to provide an indication when the body is subjected to a condition outside of a threshold, wherein the indicator is responsive to a pressure over a threshold pressure to provide an indication that the body was subjected to a pressure beyond the threshold pressure, wherein the indicator includes an indicating surface the appearance of which is changed when a pressure beyond a threshold is exerted on the indicator, wherein the indicator includes a diaphragm that defines a reference chamber, and a pin movable by the diaphragm into engagement with the indicating surface when the pressure outside of the reference chamber and acting on the diaphragm is greater than the threshold pressure, and wherein the pin includes a point that forms an indent in the indicating surface when engaged with the indicating surface.

6. The component of claim 5 wherein the body includes a fuel tank, the indicator is carried by a fuel tank and the indicating surface is a separate component from the fuel tank.

7. The component of claim 5 wherein body includes a fuel tank, the indicator is carried by the fuel tank and the indicating surface is an integral portion of the fuel tank.

8. The component of claim 5 wherein the indicating surface includes a membrane that is ruptured when acted upon by a pressure beyond the threshold pressure.

9. A fuel system component to which electricity is supplied in use, comprising:
positive and negative power terminals to which power is supplied to the component to enable operation of the component;
an electric threshold indicator communicated with the power terminals and operative to change from a first state to a second state when the voltage applied to the power terminals is beyond a threshold; and
wherein the electric threshold indicator is a single use indicator that indicates that the condition outside of the threshold has been reached.

10. The component of claim 9 wherein the electric threshold indicator includes a zener diode having a knee voltage equal to the threshold voltage and wherein the zener diode is damaged when the voltage across the zener diode exceeds the knee voltage.

11. The component of claim 10 wherein the zener diode is connected across the positive and negative power terminals.

12. A multiple condition indicator for a fuel system component, comprising:
a first indicator responsive to a first condition to provide an indication when the first condition exceeds a threshold for that condition;
a second indicator responsive to a second condition to provide an indication when the second condition exceeds a threshold for that condition;
a body of a fuel system component to which the first indicator and the second indicator are mounted, and wherein the first condition is pressure and the second condition is both different than the first condition and one of corrosivity, pressure or voltage;

wherein the first and second indicators are single use indicators that indicates when the condition outside of the threshold has been reached; and wherein the first condition is voltage and the second condition is pressure.

13. The indicator of claim 12 which also includes a third indicator responsive to a third condition to provide an indication when the third condition exceeds a threshold for that condition, and where the first condition, second condition and third condition are all different than each other.

* * * * *